INVENTORS
BERNARD DI MARCO
FRANK W. KUSSY
JOHN B. CATALDO
BY

OSTROLENK, FABER, GERB & SOFFEN
ATTORNEYS

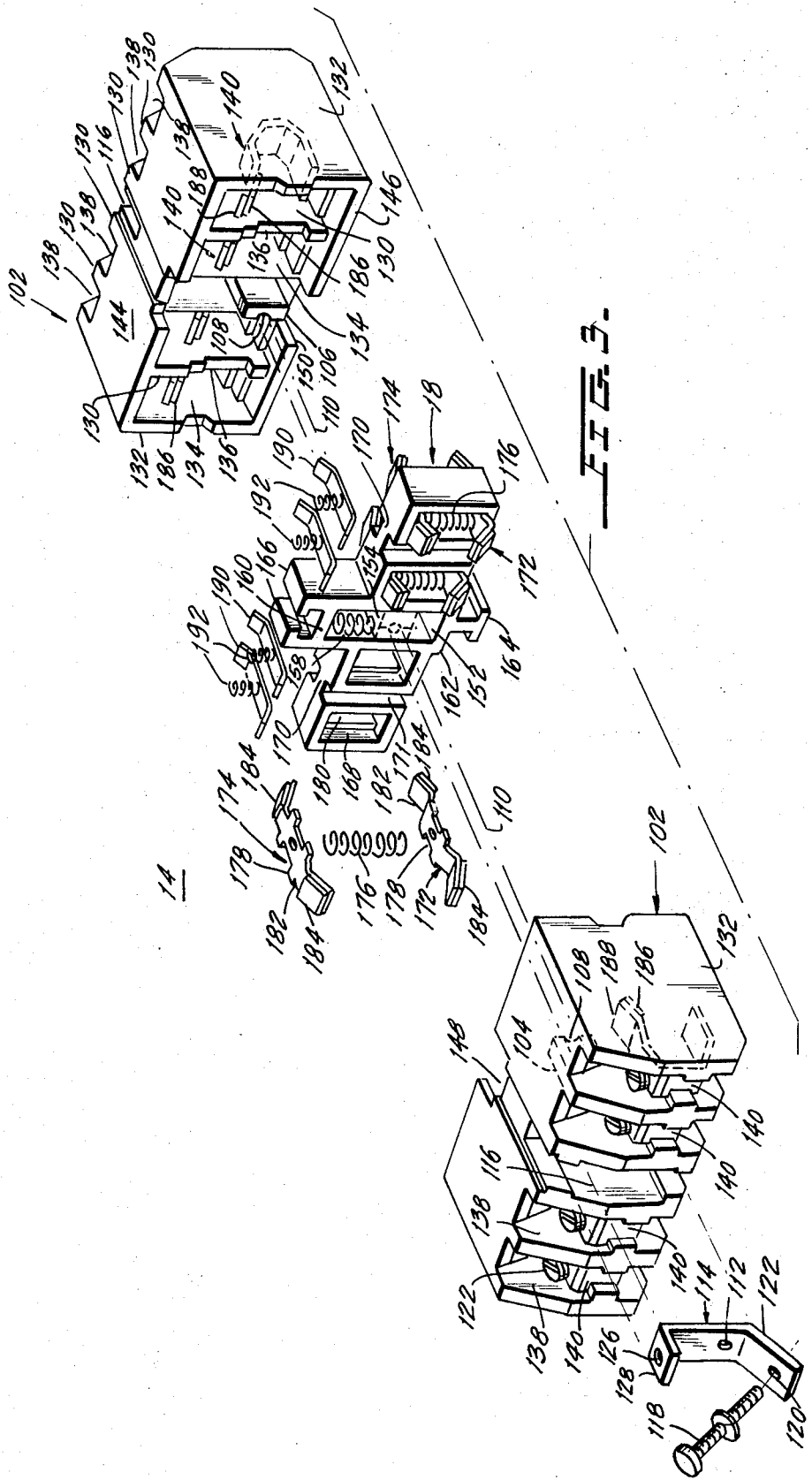

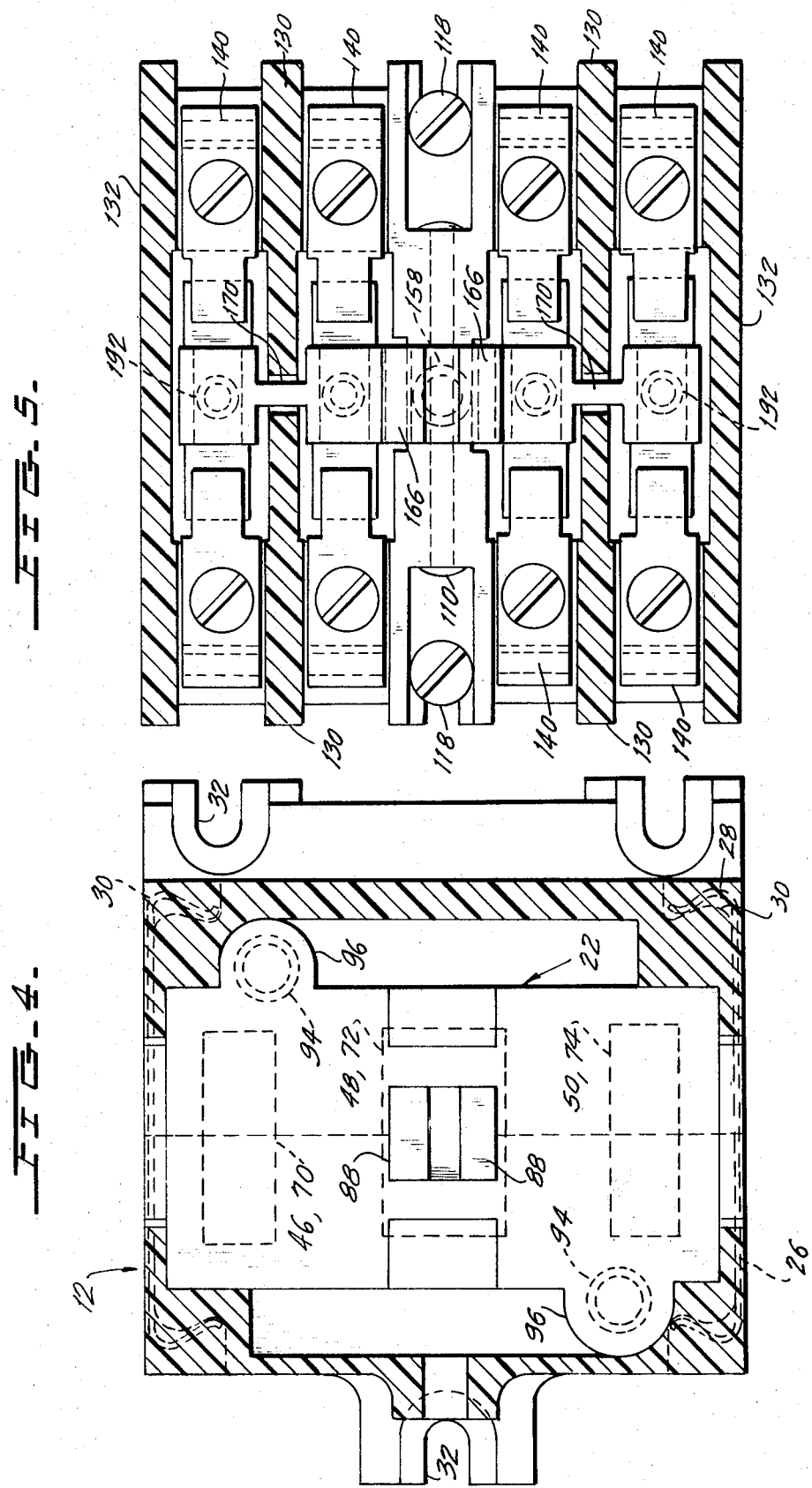

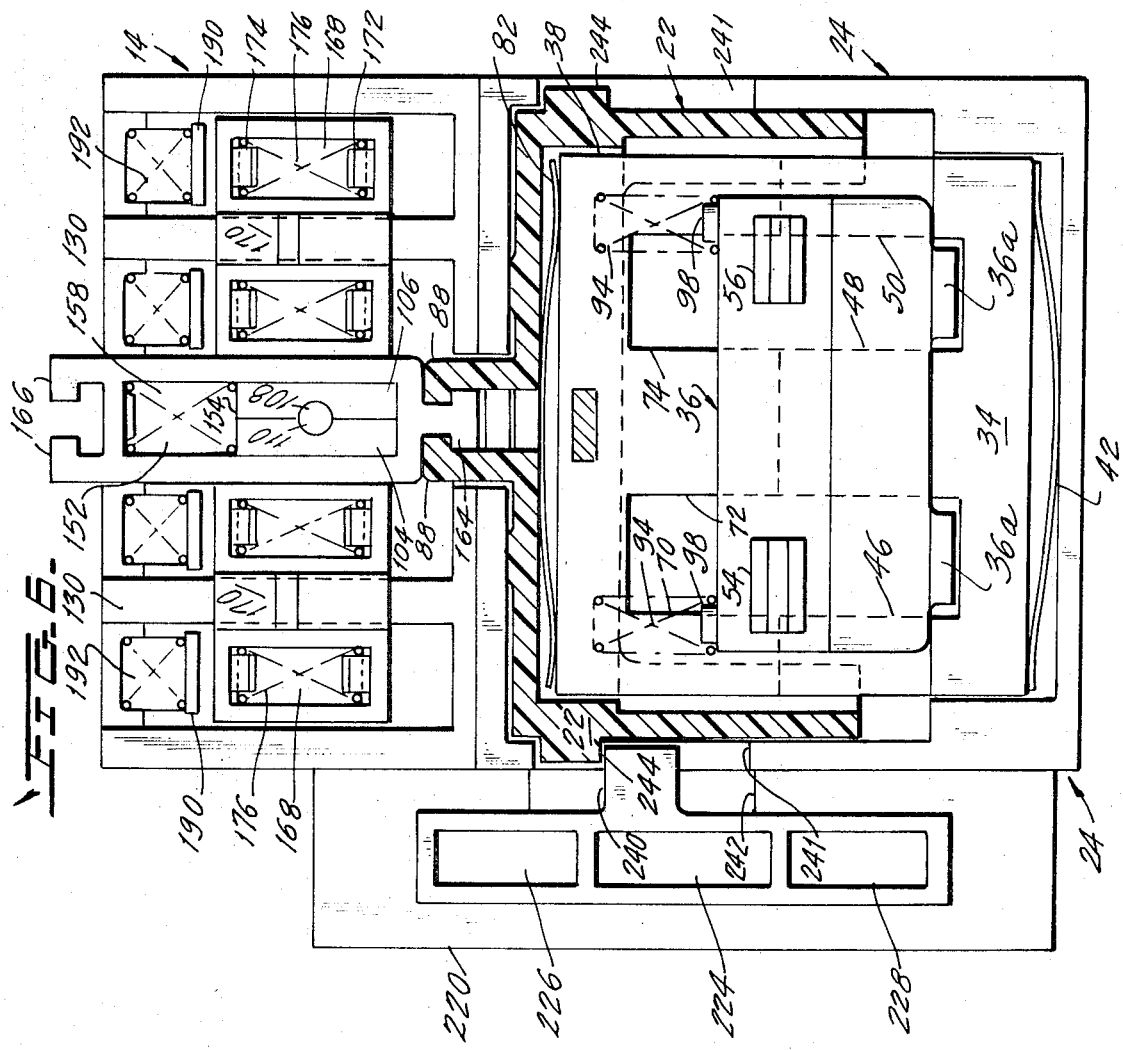
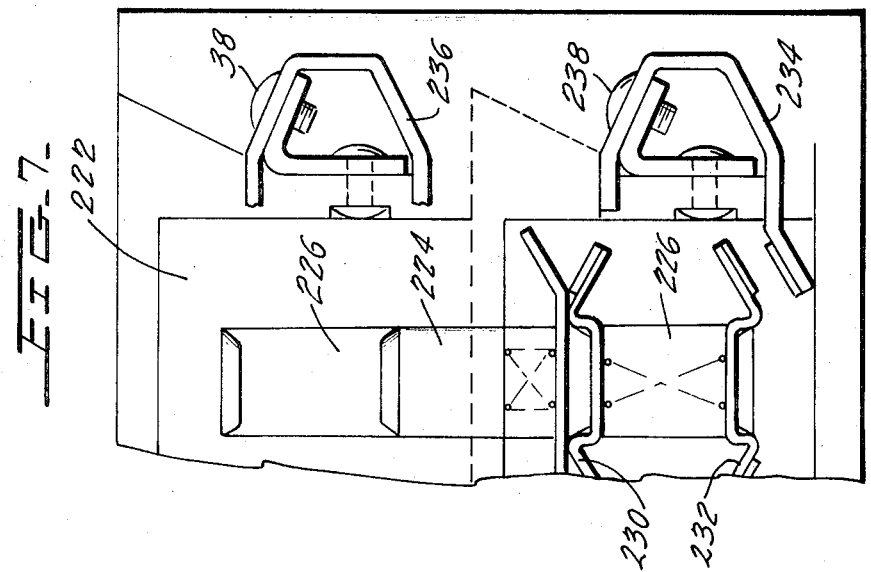

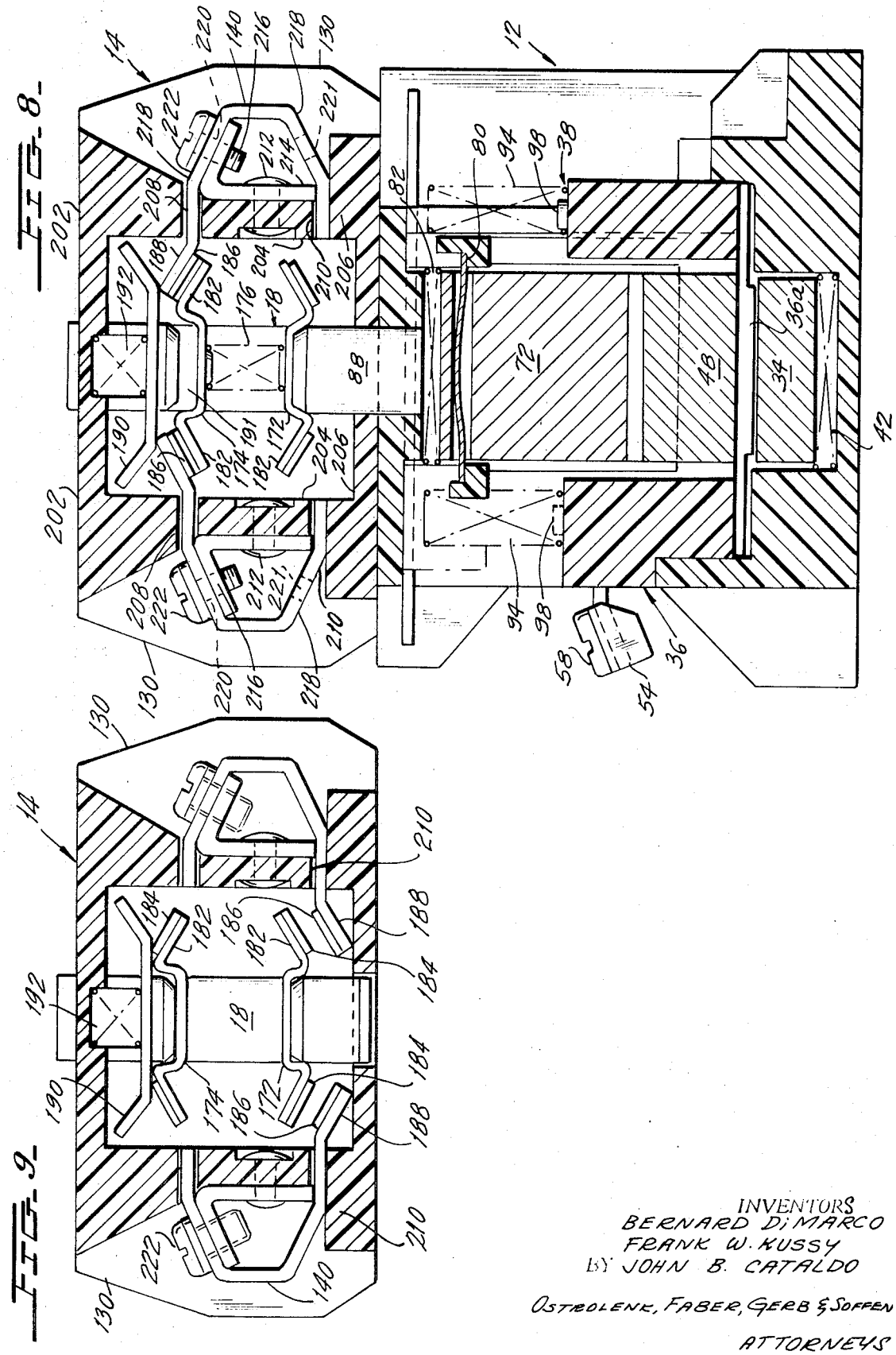

United States Patent Office 3,544,929
Patented Dec. 1, 1970

3,544,929
INDUSTRIAL CONTROL RELAY
Bernard di Marco, Lincoln Park, Frank W. Kussy, Birmingham, and John B. Cataldo, Bloomfield, Mich., assignors, by mesne assignments, to I-T-E Imperial Corporation, Philadelphia, Pa., a corporation of Delaware
Continuation of application Ser. No. 568,249, July 27, 1966. This application Jan. 17, 1969, Ser. No. 845,109
Int. Cl. H01h 51/04
U.S. Cl. 335—126                                    17 Claims

ABSTRACT OF THE DISCLOSURE

An industrial control relay including a basic magnetic operator above which may be positioned one or more integral self-contained contact blocks, each including a movable contact carrier which releasably interconnects with the contact carrier of the contact block therebeneath or to the movable armature assembly of the magnetic operator. Each contact carrier of each contact block includes a plurality of pairs of bridging contacts which cooperate with associated sets of stationary contacts to control individual circuits. Each pair of stationary contacts may be easily converted, exteriorly of the contact block, from a normally open to a normally closed position with respect to the associated pairs of bridging contacts. A novel spring biasing arrangement is provided within each contact block such that a constant force opposes the main springs in the magnetic operator regardless of the combination of normally open and normally closed contact arrangements being utilized.

---

This application is a continuation of application Ser. No. 568,249 filed July 27, 1966, now abandoned.

This invention relates to magnetically operated relay switches, and more particularly relates to an industrial control relay incorporating various features and improvements in such a manner as to permit the user to effectively control the opening and closing of virtually any number of circuits required by a particular problem.

The complexity of present day industrial circuitry dictates the need for a relay which has the following characteristics. The relay must be relatively small to occupy a minimum of panel space, be flexible enough to accommodate varying numbers of circuits in accordance with the needs of the user, permit the user to simply change any particular circuit of the relay between normally open and normally closed circuit conditions, while at the same time being of such construction as to minimize cost and guarantee reliable operation over extended periods of use.

The instant invention satisfies all of the above requirements and more, by providing an industrial control relay which is modular in nature in that it includes one basic magnet assembly above which one or more circuit controlling contact blocks may be operatively secured to one another and the operating mechanism of the magnet assembly. The use of the vertically stacked contact blocks above the one magnet assembly, permits the utilization of minimum panel space, while at the same time permitting the user to increase the number of circuits which can be controlled simply by adding additional contact blocks.

In a preferred embodiment of the instant invention each of the contact blocks includes four sets of cooperating stationary and bridging contacts, one or more of which may be easily converted between normally open and normally closed circuit conditions by merely removing, flipping over, and reinserting the stationary contacts for the circuit or circuits in question. As will be further explained in greater detail, such conversion of normally open to normally closed conditions may be accomplished by relatively unskilled personnel, completely exteriorly of the contact blocks, and without removing the contact block from its operative position above the magnet assembly, thereby eliminating the requirements prevalent in the prior art that the contact blocks be disassembled and/or removed to change the individual circuits between normally open and normally closed conditions.

As a further feature of the instant invention, and as will be further described, each contact block is provided with a novel spring biasing arrangement whereby the force exerted on the magnet of the magnet assembly will be the same regardless of the combination of normally open and normally closed circuits within the contact block. Additionally, and as will be apparent, the use of identical contact blocks necessarily reduces manufacturing costs while at the same time facilitates reliable operation.

Accordingly it is an object of the instant invention to provide an industrial control relay which includes a basic magnet operating assembly above which may be operatively secured one or more circuit controlling contact blocks.

Another object of the instant invention is to provide such an industrial control relay which is modular in nature in that the user may vary the number of circuits to be controlled by simply adding on a plurality of identical contact blocks.

Still another object of the instant inventiton is to provide such an industrial control relay wherein the individual circuits controlled thereby may be easily converted between normally open and normally closed circuit conditions exteriorly of the contact block by simply flipping over the stationary contacts of the circuit in question.

Still another object of the instant invention is to provide such an industrial control relay, the contact blocks of which employ a novel spring biasing arrangement to assure that forces acting on the magnet of the associated magnet assembly will be constant regardless of the number of normally open or normally closed circuits being utilized.

Other objects and a fuller understanding of the instant invention may be had by referring to the following description and drawings, in which:

FIG. 3 is an exploded perspective view of a circuit controlling contact block designed in accordance with the instant invention;

FIG. 4 is a plan view of the basic magnetic operating assembly of the instant invention with top portions of the housing halves thereof removed, taken along the arrows 4—4 of FIG. 1;

FIG. 5 is a plan view of a circuit controlling contact block of the instant invention, taken along the arrows 5—5 of FIG. 1;

FIG. 6 is a sectional view, taken along the arrows 6—6 of FIG. 1, showing the combination of the basic magnetic operating assembly and a circuit controlling contact block, as well as indicating the manner in which an auxiliary circuit controlling contact block may be operatively secured to the basic magnetic operating block;

FIG. 7 is a sectional front view of the auxiliary contact block shown in FIG. 6;

Figure 1:
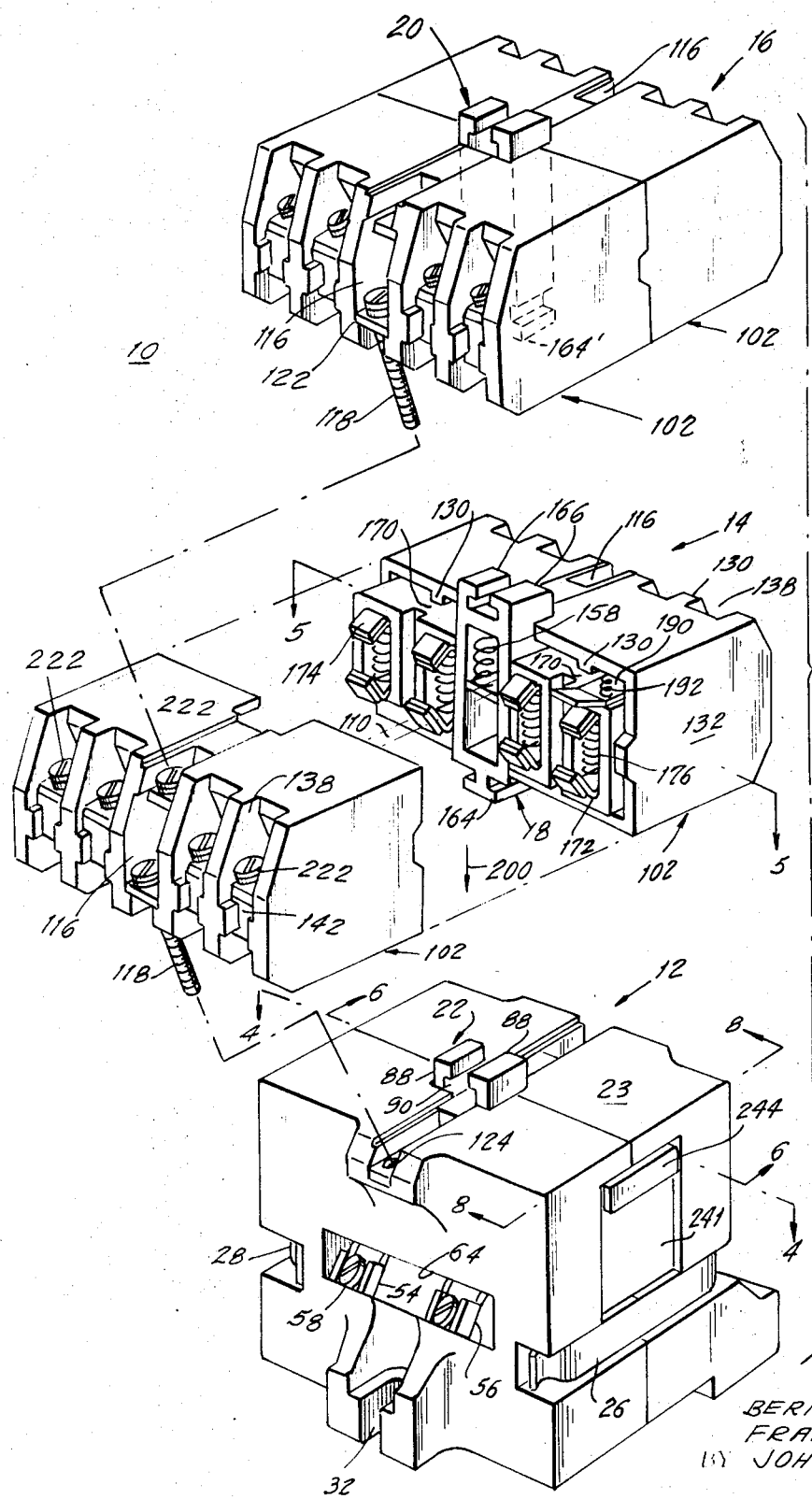
FIG. 1 is a partially exploded perspective view of an industrial control relay designed in accordance with the instant invention.

FIG. 8 is a sectional view, taken along the arrows 8—8 of FIG. 1, and showing one of the circuits of the main contact block in its normally closed condition; and FIG. 9 is a sectional view of the contact block of FIG. 8, but illustrating a circuit thereof in the normally open condition with the movable switch elements shown in the positions each will occupy when the contact block is mounted to a magnetic operating assembly.

Referring to FIG. 1, there is shown a partially exploded perspective view of an industrial control relay 10 which, in the illustrative embodiment, is shown to include a magnet block assembly 12, a first circuit controlling contact block 14 and a second circuit controlling contact block 16. As will be further explained in greater detail, contact blocks 14 and 16 are of identical construction and include contact carriers 18 and 20, respectively, which operatively engage one another and are operatively secured to an armature carrier 22 which protrudes from the upper surface 23 of the magnet block 12. As will be further explained, energization of a magnet within the magnet block 12 causes the armature carrier 22 to retract thereby similarly actuating the contact carriers 18 and 20 of contact blocks 14 and 16 to control the opening and closing of the contact arrangements therein. It is to be understood that FIG. 1 is for illustrative purposes only, in that more or less than two contact blocks such as 14 and 16 may be stacked upon one another and operated by the single magnet block 12 by means of the interconnected contact carriers of the contact blocks therebeneath.

Figure 2:
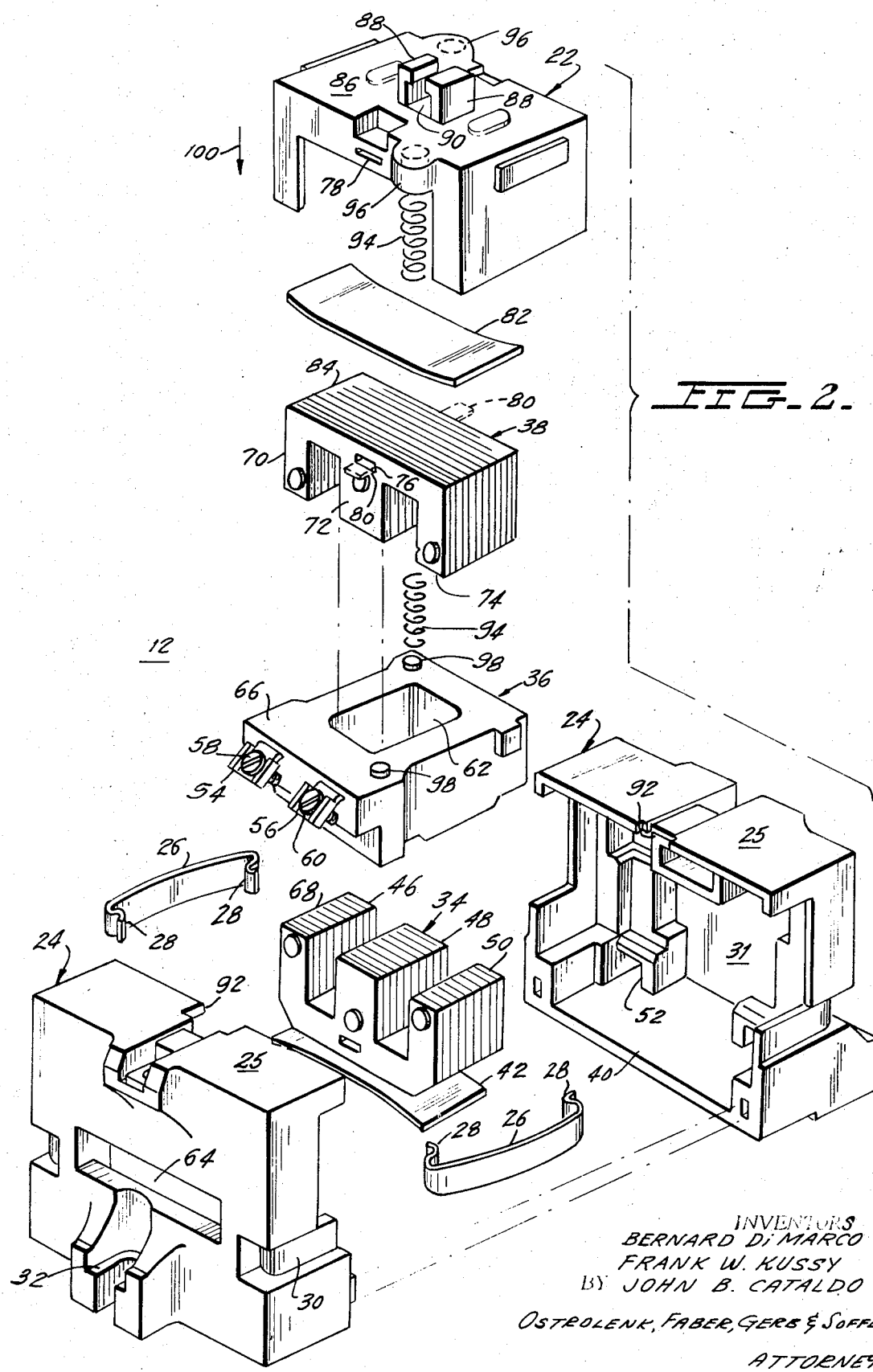
FIG. 2 is an exploded perspective view of the basic magnetic operating assembly of the instant invention.

As most clearly shown in FIG. 2, the magnet block 12 consists of two housing halves 24, of suitable insulating material, which are normally held in abutting relationship by a pair of spring clips 26 having inturned ends 28 which grasp similarly shaped projections 30 on the respective housing halves 24 are provided with U-shaped mounting portions 32 (see plan view of FIG. 4) by which the magnet block 12 may be appropriately secured to a supporting surface.

When housiig halves 24 are held together by clips 26 they form an interior cavity 31 within which are retained a magnetic yoke or core 34, a magnetic coil 36, an armature 38, and the armature carrier 22 in the following manner. Disposed on the lower surface 40 of the interior cavity 31 is a cushioning spring 42 upon which is seated, in the illustrative embodiment, the three-legged yoke 34.

The magnetic coil 36 is a completely encapsulated unit having terminal straps 54 and 56 through which wire clamps 58 and 60 are threaded. Coil 36 is provided with a centrally disposed aperture 62 by which the coil 36 may be seated upon the center leg 48 of the core or yoke 34 in such a manner that the terminal straps 54 and 56 extend out an elongated aperture 64 provided in one of the housing halves 24 to facilitate the connection of an energizing circuit thereto.

The armature 38 is shown in FIG. 2 as including three legs 70, 72 and 74 which are drawn into engagement with respective legs 46, 48 and 50 of core 34 upon the energization of coil 36. Armature 38 includes an elongated aperture 76 which is aligned with apertures 78 provided on the opposite sides of the armature carrier 22 such that a retaining spring 80 may be passed through apertures 78 and aperture 76 to secure armature carrier 22 to the armature 38 for movement therewith. A cushioning spring 82 is disposed between the upper surface 84 of the armature 38 and the under surface of armature carrier 22 (not seen in FIG. 2) to properly bias and locate the armature. The upper surface 86 of armature carrier 22 includes upstanding L-shaped projections or claws 88 which define a passageway 90 therethrough by which the contact carriers such as 18 or 20 of the contact blocks 14 and 16 of FIG. 1 may be operatively connected to and made movable with the armature carrier 22 in response to energization of the relay coil 36.

Housing halves 24 include mating cut-out notches 92 through which the upstanding claws 88 of the armature carrier 22 may extend when the entire magnet block 12 is assembled. Return springs 94 are disposed between outstanding projectiois 96 of the armature carrier 22 and the upper surface 66 of the relay coil 36 and aligned thereon by upstanding buttons 98 to return the armature 38 and armature carrier 22 to the upper position (with the claws 88 of armature carrier 22 occupying the position shown in FIG. 1) in response to de-energization of the relay coil 36.

In operation, when the relay coil 36 is energized by means of terminals 54 and 56, the armature 38 and armature carrier 22 are moved in the direction of arrow 100 until the armature legs 70, 72 and 74 about the core legs 46, 48 and 50 whereby, and as will be explained in greater detail, the contact carriers such as 18 and 20 in FIG. 1 will be similarly actuated to open and/or close the various contact arrangements within contact blocks 14 and 16. Upon de-energization of the relay coil 36, the return springs 94 return the armature carrier 22 and armature 38 to their original position, and similarly the contact carriers 18 and 20 of the contact blocks 14 and 16 are returned to their original position.

The cooperation of the various parts of the magnet block 12 may be seen in assembled relationship in the plan view of FIG. 4, which shows the magnet block 12 with the upper surfaces 25 removed from housing halves 24; the sectional view of FIG. 6 which is taken along the arrows 6—6 of FIG. 1; and the sectional view of FIG. 8 taken along the arrows 8—8 of FIG. 1.

Turning to FIG. 3, it may be seen that the contact block 14 (and 16, as well as any additional contact blocks which may be utilized) comprises a pair of contact block cases 102 which include semi-circular projections 104 and 106 which mate with one another to form an elongated aperture 108 therethrough when the contact cases 102 are held in abutting relationship with one another. The aperture 108 receives suitable fastening means such as rivet 110 which simultaneously passes through apertures 112 provided in mounting brackets 114 disposed in recesses 116 provided centrally on the exterior of each case 102 (see also FIG. 1). Fastening means such as screws 118 pass through apertures 120 provided on bent portions 122 of brackets 114 into tapped apertures 124 provided on opposite sides of the upper surface 23 of magnet block 12 to secure the contact block 14 to the magnet block. Similarly, screws 118 of contact block 16 are received by internally threaded apertures 126 in tabs 128 of mounting brackets 114 of contact block 14 to secure the contact block 16 to the upper surfaces 144 of contact block 14.

Contact block cases 102 include a plurality of internal insulating barriers 130 which, together with the outer walls 132 of the contact cases, define a plurality of cavities 134, which, as will be further explained, insulatingly house the cooperating contacts of each circuit controlling contact arrangement. Insulating barriers 130 include cut-out notches 136, which, as will be further explained, guide the movement of the contact carrier 18 disposed within the abutted contact cases 102.

As can be seen in FIG. 3, the exterior of each contact block case 102 is further provided with a plurality of recesses 138 which are aligned with respective interior cavities 134 to house stationary contacts 140, in a manner to be further described. The recesses 138 are defined by the end surfaces 132 of the contact block cases 102 and extensions of the insulating barriers 130 in such a manner as to insulate the exposed portions of the stationary contacts 140 with respect to one another. Upper and lower surfaces 144 and 146, respectively, of contact block cases 102 are provided with cut-out notches 148 and 150, respectively, which cooperate to define upper and lower openings in the assembled contact block 14 to accommodate the contact carrier 18 in the following manner.

Contact carrier 18 is preferably of one-piece construction of suitable insulating material and includes elongated central aperture 152 through which the mating projections 104 and 106 of the cases 102 may pass in securing such cases together, as by the rivet 110 passing through the aperture 108. The phantom lines in FIG. 3, showing projections 104 and 106 in abutting relationship, illustrate that with the contact block cases 102 assembled, such projections 104 and 106 form a seating surface 154 upon which is seated one end of a return spring 158. The opposite end of the return spring 158 is retained under an upper surface 160 of elongated aperture 152 such that the entire contact carrier 18 is normally biased upward (relative to the cases 102 and the magnet block 12) in FIG. 3 by the return spring 158. Depending from the lower surface 162 of the centrally elongated aperture 152 is a generally I-shaped projection 164 which passes through the lower opening in the assembled contact block 14 (defined by the cut-out notches 150 in the lower surfaces 146 of the contact block cases 102) such that it may be passed under the inwardly turned portions of upstanding claws 88 of the armature carrier 22 of the magnet block 12 to assure simultaneous movement of the armature carrier 22 and the contact carrier 18. Similarly, the upper surface 160 of elongated aperture 152 of the carrier 18 includes a pair of upstanding, claw-like projections 166 which extend through the upper opening in the assembled magnet block 12 (defined by the cut-out notches 148 in the upper surfaces 144 of cases 102). Thus the lower I-shaped projection 164' of the contact carrier 20 of contact block 16 in FIG. 1 may be passed beneath the inwardly turned portions of the claw-shaped projections 166 in operatively securing the upper contact block 16 of FIG. 1 to the lower contact block 14. Similarly, additional contact blocks may be operatively secured above contact block 16.

Disposed on opposite sides of elongated aperture 152 of the carrier 18 are a plurality of spaced apart elongated apertures or receptacles 168 joined by recessed rib portions 170. The notches 171 defined by ribs 170 and the respective sides of adjoining apertures 168, are received by the cut-out notches 136 in insulating barriers 130 of the cases 102 to guide the movement of contact carrier 18 in response to movement of the armature carrier 22 of the magnet block 12. (See FIG. 1 for the manner in which the notches 171 cooperate with the barriers 130 within magnet block 12.)

Received within each of the spaced apart receptacles 168 of the contact carrier 18 is a pair of bridging contacts 172, 174 which are urged apart against the opposite surfaces of the respective receptacles by biasing springs 176. Bridging contacts 172 and 174 include cut-out notches 178, which cooperate with outstanding ribs 180 provided within the receptacles to maintain the bridging contacts therein. The bridging contacts 172 and 174 include angled end portions 182 carrying terminal pads 184 which cooperate with terminal pads 186 provided on angled portions 188 of stationary contacts 140, in a manner to be further described.

Disposed between the upper surfaces of each receptacle 168 of the contact carrier 18 and the under surface of upper wall 144 of the contact block cases 102 are a plurality of spring retainers 190 which are biasingly urged against either the terminal pads 184 of upper bridging contact 174 (FIG. 9) or the upturned portions 188 of the stationary contacts 140 (FIG. 8) by biasing springs 192 (only one retainer 190 and biasing spring 192 being shown in FIG. 1) for purposes to be further described. See also FIG. 6.

It should be pointed out that the construction of contact block 16 of FIG. 1 is identical to the construction of contact block 14 described above, thereby reducing manufacturing costs. Furthermore, although the contact blocks have been shown to include four sets of cooperating bridging and stationary contacts, it is understood that the principles of the instant invention could be extended to provide a contact block having either more or less cooperating contact arrangements. For example, the contact carrier 18 of FIG. 3 could easily be manufactured with additional bridging contact receiving receptacles 168 on either side of the central receptacle 152 and similarly the housing cases 102 could be lengthened to accommodate an enlarged contact carrier. In any event it will be seen that by simply inserting the depending I-shaped projection 164 (and 164') of the contact carrier 18 (and 20) within the passageway 90 defined by the inturned portions of the claw-like projections 88 (and 166) and screwing fastening means 118 into the tapped apertures 124 (or 126), the contact blocks 14 (16) will be securely and operatively positioned with respect to the magnet block 12 and with respect to one another. Obviously such interconnection may be accomplished by unskilled personnel; may be performed in the field as opposed to within a factory; and requires only a screw driver type tool to accomplish the interconnection. Furthermore, the modular or building block approach minimizes the cross-sectional area required by the industrial control relay while still permitting the user to accommodate additional circuits by adding more contact blocks in the vertical direction.

In operation, energization of the relay coil 36 of the magnet block 12 draws the armature carrier 22 toward the core or yoke 34, thereby simultaneously drawing the contact carrier 18 (and 20) and the bridging contacts 172, 174, carried thereby downward in the direction of arrow 200 of FIG. 1 to open or close the various circuits being controlled in a manner to be described. De-energization of the coil 36 allows the return spring 94 of magnet block 12 to return the armature 38 and armature carrier 22 to their original position. Such movement is aided by the compressive bias established by return spring 158 within the contact block 14 (16).

Turning to FIGS. 8 and 9, there is shown the manner in which the movement of contact carrier 18 controls the opening and closing of the circuits being controlled by the instant invention; the manner in which the individual circuits being controlled can be simply and easily converted between a normally open and normally closed condition from the exterior of the contact blocks 14 (and/or 16) without the necessity of removing the contact blocks from their stacked relationship; and the novel cooperation of the various biasing springs in such a manner as to maintain as a constant force on the magnetic operating assembly of the magnet block 12 regardless of the particular configuration of normally open or normally closed contact arrangements being utilized at any given time. It should be noted that FIGS. 8 and 9 illustrate the interaction of only one circuit controlling contact arrangement within the contact block 14 (or 16) and that the remaining three contact arrangements within each block (or blocks) operate in exactly the same manner.

Referring specifically to FIG. 8, it may be appreciated that portions 202, 204 and 206 of casing blocks 102 integrally join the insulating barriers 130 and define openings or slots 208 and 210 within each recess 138 through which various portions of the stationary contacts 140 may pass into cooperative engagement with the respective bridging cntacts 172 and 174 of each circuit controlling arrangement. Secured to portions 204 by suitable means, such as by rivets 212, are angular terminal supports 214 which include on their angled portions threaded apertures 216.

Stationary contacts 140 are generally U-shaped but as noted previously include the outwardly angled portions 188 which carry the terminal pads 186. Angular portions 218 of the U-shaped portion of stationary contacts 140 include apertures 220 and 221, one of which is aligned with the threaded aperture 216 provided in the terminal supports 214 depending upon whether the angular portions 188 of the stationary contacts 140 enter the interior of the contact block 14 through slots 208 or 210. Wire gripping screws 222 pass through apertures 220 (or apertures 221) of stationary contacts 140 into apertures 216 of the terminal supports 214 to rigidly secure the stationary contacts 140 in place while at the same time provide means by which the wires from the circuit being controlled may be mechanically and electrically secured to the stationary contacts 140.

With angled portions 188 of stationary contacts 140 inserted through slots 208, in the manner shown in FIG. 8, and with the relay coil 36 of magnet block 12 de-energized (as indicated by the space between center leg 72 of armature 38 and the center leg 48 of the core or yoke 34), the terminal pads 184 on the angled portion 182 of upper bridging contacts 174 engage the terminal pads 186 provided on the angular portions 188 of the stationary contacts 140 thereby forming a normally closed circuit therethrough. Energization of the relay coil 36 draws the armature 38, armature carrier 22 and contact carrier 18 downward to disengage the mating terminal pads 184, 186 and open the circuit therethrough. Upon deenergization, the return springs 94 and 158 of the magnet block 12 and contact block 14, respectively, return the contact carrier 18 to the position shown in FIG. 8 such that the terminal pads 184, 186 are once more engaged.

Turning to FIG. 9, there is shown a similar contact arrangement, but in this case with the angular portions 188 of stationary contacts 140 reversed or flipped over so as to enter the interior of contact block 14 through the lower slots 210. The positioning of slots 210 is such that with the relay coil 36 of the magnet block 12 deenergized, the terminal pads 184 provided on the angular portions 182 of lower bridging contact 172 are out of engagement with the terminal pads 186 on the angular portions 188 of stationary contacts 140. Thus FIG. 9 functions as a normally open circuit which can be closed only in response to energization of the relay coil 36.

It may be appreciated that in either the normally open or normally closed embodiment the angled cooperation between the bridging contacts 172 and 174 and the stationary contacts 140 assures a wiping action as the contact pads 184 and 186 are brought into engagement with one another thereby continually nullifying the effect of contact corrosion.

It should now be apparent that the instant invention provides that any one or more of the individual contact arrangements of the contact blocks 14 and 16 may be interchanged between normally open and normally closed conditions by simple steps which can be performed entirely from the exterior of the contact blocks and without the necessity of disassembling the contact blocks from their stacked relationship above the magnet block 12. Specifically, in order to change any one of the circuit arrangements within magnet block 12 between the normally closed position of FIG. 8 and the normally open position of FIG. 9 it is merely necessary to unscrew the wire clamping screws 222, remove the stationary contacts 140 from the slots 208 and 210, flip the stationary contacts 180°, reinsert the stationary contacts 140, and reinsert the wire clamping screws 222 through the apertures 221 provided on the oppositely slanted portions 218 of the stationary contacts 140 and into the threaded aperture 216 provided in the terminal brackets 214. Obviously such steps may be performed by unskilled personnel and require the use of only a screw driver.

It will be seen in FIG. 8 that the retainer 190 is held back by the angled portions 188 of stationary contacts 140 such that the biasing spring 192 associated with such retainer exerts no influence on the contact carrier 18 or armature carrier 22. In contrast, in FIG. 9 it can be seen that the retainer 190 is biased by retainer spring 192 into engagement with the upper surface of the contact carrier 18. The function of retainers 190 and springs 192 in the embodiments of FIGS. 8 and 9 will now be explained.

Turning first to FIG. 8, it will be seen that with the inturned portions 188 of stationary contacts 140 preventing the movement of retainer 190, the biasing springs 192 are defeated. Hence in the normally closed embodiment, only the internal spring 176 produces a force in a direction opposite to forces developed by the return springs 94 of the magnet block 12. (Note the space 191 between the bridging contact 174 and the underside of the upper surface of the contact carrier 18 which dictates that the spring 176 be under compression.)

In the normally open construction of FIG. 9, the retainer 190 seats on the contact carrier 18 and only biasing spring 192 develops a force in a direction opposite the forces developed by return springs 94 in magnet block 12. (Note that in this embodiment spring 176 is retained at both ends by the contact carrier 18.)

By choosing springs 176 and 192 with the same spring constants, it necessarily follows that regardless of whether, the sets of contacts in a given block are all normally open, all normally closed, or a combination of normally open and normally closed the vector sum of the forces developed by the springs of the contact block and transmitted to block 12 will always be the same. Thus, the necessary force developed by the magnet of block 12 to overcome the vector sum can be a constant over the lifetime of the industrial control relay. With a constant and known spring force to overcome, the magnet can be more effectively miniaturized and at the same time is necessarily more reliable for longer periods of use.

Turning to FIGS. 6 and 7 there is shown the manner in which extra circuits may be controlled by the industrial control relay without the necessity of adding an entire contact block. Specifically, a casing 220 is provided with an interior cavity 222 in which is movable an auxiliary contact carrier 224 having a pair of spaced receptacles 226 and 228 provided thereon. Receptacles 226 and 228 carry pairs of bridging contacts 230 and 232 which cooperate with stationary contacts 234 (and 236), in a manner exactly the same as the cooperation explained with respect to FIGS. 8 and 9. Similarly, stationary contacts 234 and/or 236 may be withdrawn and flipped over to convert the circuits cooperating therewith between a normally open and normally closed condition by simply removing the wire gripping screws 238.

Contact carrier 224 includes a projection 240 movable within a slot 242 provided in one wall of the casing 220. Such projection enters a slot 241 in the magnet block 12 to intercept the path of movement of portions 244 of the armature carrier 22, when the casings 222 are secured to the magnet block 12. Thus movement of the auxiliary contact carrier 224 is controlled by movement of the armature carrier 22 to open and close the auxiliary contacts provided in housing 220 in the same manner as suggested with respect to the contact blocks 14 and 16. If desired, a second casing 220 may be operatively secured to the opposite side of magnet block 12 also.

Thus there has been described an industrial control relay which is modular in nature in that it includes a basic magnetic operating block to which may be simply and easily operatively secured one or more plural circuit controlling contact blocks. Each contact block has been shown to include individual circuit controlling contact arrangements each of which is operable in response to energization of the basic magnetic operating assembly to open or close its respective circuit depending upon whether a normally open or normally closed circuit condition has been chosen.

Additionally, each of the individual circuits controlled by the contact block may be easily converted between normally open and normally closed conditions by relatively unskilled personnel using simple tools, without the necessity of disassembling the contact block or removing such contact block from its stacked relationship with respect to the magnetic operating block. Thus each contact block leaves the factory as a "tamper-proof" integral unit which prevents unauthorized disassembly, while at the same time permits the flexibility of converting between normally open and normally closed circuit conditions which is required in field use.

Furthermore, each contact block is provided with a novel arrangement of biasing springs, such that regardless of the combination of normally open or normally closed arrangements utilized the force exerted on the magnetic operating assembly is constant thereby materially increasing the reliability and lifetime of the overall industrial control relay.

A further feature of the instant invention provides that auxiliary contact blocks may be operatively secured to the sides of the magnetic operating block to provide for one or more additional circuits without the necessity of adding an entire contact block.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An industrial control relay comprising:
a magnet assembly including securement means movable between a first and second position in response to energization of said magnet assembly;
a first main contact block removably positioned on said magnet assembly and including a pair of stationary contacts mounted thereon and a contact carrier movable therein between a first positoin in which a bridging contact thereof engages said stationary contacts, and a second position in which said bridging contact is out of engagement with said stationary contacts, said contact carrier being removably secured to said securement means whereby movement of said securement means between its first and second position moves said contact carrier between its first and second position; the contact carrier of said first main contact block including a second bridging contact mounted thereon and movable therewith, said pair of stationary contacts and said first main contact block having cooperating configuration means for interchangeably positioning said stationary contacts in a first position in which they engage the first bridging contact when said contact carrier is in its first position, and a second position in which they engage said second bridging contact when said contact carrier is moved to its second position in response to movement of said securement means to its second position, an individual means selectively securing each of said stationary contacts in its first and second positions, said individual means positioned for operation externally of said first main contact block, each stationary contact of said pair of stationary contacts including a single bridging contact-engaging portion, an individual wire gripping means connected to each of said stationary contacts, each of said wire gripping means occupying the same position on said contact block when its connected stationary contact is in either of its said first and second positions.

2. An industrial control relay comprising:
a magnet assembly including securement means movable between a first and second position in response to energization of said magnet assembly;
a first main contact block removably positioned on said magnet assembly and including a pair of stationary contacts mounted thereon and a contact carrier movable therein between a first position in which a bridging contact thereof engages said stationary contacts, and a second position in which said bridging contact is out of engagement with said stationary contacts, said contact carrier being removably secured to said securement means whereby movement of said securement means between its first and second position moves said contact carrier between its first and second position; the contact carrier of said first main contact block including a second bridging contact mounted thereon and movable therewith, said pair of stationary contacts and said first main contact block having cooperating configuration means for interchangeably positioning said stationary contacts in a first position in which they engage the first bridging contact when said contact carrier is in its first position, and a second position in which they engage said second bridging contact when said contact carrier is moved to its second position in response to movement of said securement means to its second position, each stationary contact of said pair of stationary contacts including a single bridging contact-engaging portion, an individual wire gripping means connected to each of said stationary contacts, each of said wire gripping means occupying the same position on said contact block when its connected stationary contact is in either of its said first and second positions; said magnet assembly including biasing return means for returning said securement means to its first position in response to de-energization of said magnetic means, said first and second bridging contacts being spaced apart by first biasing means, and further including second biasing means spaced between said contact block and said contact carrier for urging said contact carrier against the bias of said return spring when said stationary contacts are in their second position.

3. The industrial control relay of claim 2, and further including retainer means positioned between said second biasing means and said contact carrier; said second biasing means being prevented from urging said contact carrier toward its second position by said pair of stationary contacts when said stationary contacts are in their first position; said first biasing means urging said contact carrier against the bias of said return spring when said stationary contacts are in their first position.

4. The industrial control relay of claim 3, wherein said first and second bias means are springs having the same spring constant whereby said contact carrier will be urged toward its second position against the bias of said return spring by the same amount of force regardless of whether it is urged toward its second position by said first or second bias means.

5. The industrial control relay of claim 1, and further including a second main contact block removably positioned above said first main contact block and having an identical construction therewith, the contact carrier of said second main contact block being removably secured to the contact carrier of said first main contact block for movement therewith in response to movement of said securement means.

6. The industrial control relay of claim 5, wherein said first and second main contact block include interior cavities in which their respective contact carriers are guidingly moved and wherein the stationary contacts of said first and second main contact blocks include bridging contact-engaging portions extending into their respective cavities, and conductor-connecting portions removably secured to their respective contact blocks outside of said cavity, whereby said stationary contacts of said first and second main contact blocks can be interchanged between their first and second positions from the outside of their respective cavities.

7. The industrial control relay of claim 1, wherein said magnet assembly includes a housing of insulating material, said housing having an internal cavity therein; a magnetic operating assembly removably positioned in said cavity, said magnetic operating assembly including a yoke, an energizable winding positioned about a portion of said yoke, and an armature normally biased toward a first position away from said yoke and movable toward said yoke to a second position in response to energization of said winding; said securement means being secured to said armature for movement therewith and including a portion thereof which extends through a surface of said housing out of said cavity and into detachable securement with said contact carrier; said magnet assembly including biasing return means for returning said armature and said securement means to their first position in response to de-energization of said winding, and said first and second bridging contacts are spaced apart by first biasing means, and further including second biasing means acting between said contact block and said contact carrier for urging said contact carrier against the bias of said return spring when said stationary contacts are in their second position.

8. The industrial control relay of claim 1, wherein said first main contact block includes an interior cavity in which said contact carrier is guidingly moved and wherein said stationary contacts are of one-piece construction and also include a conductor-connecting portion removably secured to said housing outside of said cavity whereby said stationary contacts can be interchanged between their first and second positions from the outside of the housing, said wire gripping means connected to said conductor-connecting portions externally of said cavity and constituting said individual means securing said stationary contacts to said housing.

9. A contact block assembly comprising:
  a housing having a cavity therein;
  a contact carrier having a first pair of bridging contacts spaced apart thereon, said contact carrier being movable within said cavity between a first and second position;
  a first pair of stationary contacts removably positioned on said housing, said first pair of stationary contacts and said housing having cooperating formation means for interchangeably positioning said first pair of stationary contacts between a first position in which they engage one of said bridging contacts when said contact carrier is in its first position, and a second position in which they engage the other of said bridging contacts when said contact carrier is in its second position;
  an individual means selectively securing each of said stationary contacts in its first and second positions, said individual means positioned for operation externally of said contact blocks;
  each stationary contact of said pair of stationary contacts including a single bridging contact-engaging portion extending into said cavity, an individual wire gripping means connected to each of said stationary contacts, each of said wire gripping means occupying the same position on said housing when its connected stationary contact is in either of its said first and second positions.

10. The contact block of claim 9 wherein said stationary contacts include a conductor-connecting portion removably secured to said housing outside of said cavity whereby said stationary contacts can be interchanged between their first and second positions from the outside of said housing, said wire gripping means connected to said conductor-connecting portions externally of said cavity and constituting said individual means securing said stationary contacts to said housing.

11. The contact block of claim 9 wherein said contact carrier includes a second pair of bridging contacts spaced apart thereon; a second pair of stationary contacts removably positioned on said housing; said second pair of stationary contacts being interchangeable between a first position in which they engage one of said pair of bridging contacts when said contact carrier is in its first position, and a second position in which they engage the other of said second pair of bridging contacts when said contact carrier is in its second position; said first and second pairs of bridging contacts being spaced apart by first and second biasing means, respectively; third and fourth biasing means positioned between said housing and said contact carrier for urging said contact carrier toward its second position whenever the respective stationary contact pair associated therewith is in its second position.

12. The contact block of claim 11, and further including first and second biasing means retainers positioned between said third and fourth biasing means and said ones of said first and second pairs of bridging contacts, respectively; said first and second biasing means retainers being prevented from engaging said ones of said pairs of bridging contacts by the respective pair of stationary contacts associated therewith when said respective pairs of stationary contacts are in their first position.

13. The contact block of claim 12, wherein said first and third and second and fourth biasing means are springs having the same spring constant.

14. An industrial control relay comprising:
  a magnet assembly including securement means movable between a first and second position in response to energization of said magnet assembly;
  a first main contact block removably positioned on said magnet assembly and including a pair of stationary contacts mounted thereon and a contact carrier movable therein between a first position in which a bridging contact thereof engages said stationary contact, and a second position in which said bridging contact is out of engagement with said stationary contacts, said contact carrier being removably secured to said securement means whereby movement of said securement means between its first and second position moves said contact carrier between its first and second position; the contact carrier of said first main contact block including a second bridging contact mounted thereon and movable therewith, said pair of stationary contacts and said first main contact block having cooperating configuration means for interchangeably positioning said stationary contacts in a first position in which they engage the first bridging contact when said contact carrier is in its first position, and a second position in which they engage said second bridging contact when said contact carrier is moved to its second position in response to movement of said securement means to its second position;
  each stationary contact of said pair of stationary contacts including a single bridging contact-engaging portion, an individual wire gripping means connected to each of said stationary contacts, each of said wire gripping means occupying the same position on said contact block when its connected stationary contacts is in either of its said first and second positions;
  said magnet assembly including biasing return means for returning said securement means to its first position in response to de-energization of said magnetic means, and said first and second bridging contacts are spaced apart by first biasing means, and further including second biasing means spaced between said contact block and said contact carrier for urging said contact carrier against the bias of said return spring when said stationary contacts are in their second position;
  retainer means positioned between said second biasing means and said contact carrier, said second biasing means being prevented from urging said contact carrier toward its second position by said pair of stationary contacts when said stationary contacts are in their first position; said first biasing means urging said contact carrier against the bias of said return spring when said stationary contacts are in their first position.

15. The industrial control relay of claim 14, wherein said first and second bias means are springs having the same spring constant whereby said contact carrier will be urged toward its second position against the bias of said return spring by the same amount of force regardless of whether it is urged toward its second position by said first or second bias means.

16. A contact block assembly comprising;

a housing having a cavity therein;

a contact carrier having a first pair of bridging contacts spaced apart thereon, said contact carrier being movable within said cavity between a first and second position;

a first pair of stationary contacts removably positioned on said housing, said first pair of stationary contacts and said housing having cooperating formation means for interchangeably positioning said first pair of stationary contacts between a first position in which they engage one of said bridging contacts when said contact carrier is in its first position, and a second position in which they engage the other of said bridging contacts when said contact carrier is in its second position;

each stationary contact of said pair of stationary contacts including a single bridging contact-engaging portion extending into said cavity, and individual wire gripping means connected to each of said stationary contacts, each of said wire gripping means occupying the same position on said housing when its connected stationary contact is in either of its said first and second positions;

said contact carrier including a second pair of bridging contacts spaced apart thereon; and further including a second pair of stationary contacts removably positioned on said housing, said second pair of stationary contacts being interchangeable between a first position in which they engage one of said pair of bridging contacts when said contact carrier is in its first position, and a second position in which they engage the other of said second pair of bridging contacts when said contact carrier is in its second position; said first and second pairs of bridging contacts are spaced apart by first and second biasing means, respectively; and further including third and fourth biasing means spaced between said housing and said contact carrier for urging said contact carrier toward its second position whenever the respective stationary contact pair associated therewith is in its second position;

first and second biasing means retainers positioned between said third and fourth biasing means and said ones of said first and second pairs of bridging contacts, respectively, said first and second biasing means retainers being prevented from engaging said ones of said pairs of bridging contacts by the respective pair of stationary contacts associated therewith when said respective pairs of stationary contacts are in their first position.

17. The contact block of claim 16 wherein said first and third and second and fourth biasing means are springs having the same spring contact.

References Cited

UNITED STATES PATENTS

| 2,918,554 | 12/1959 | Brauneck | 200—16(.1) |
| 2,924,685 | 2/1960 | Burch | 200—16(.1) |
| 3,315,060 | 4/1967 | Rothweiler | 200—168(5) |

HAROLD BROOME, Primary Examiner

U.S. Cl. X.R.

335—132